United States Patent
Brand, Jr. et al.

(10) Patent No.: US 6,246,360 B1
(45) Date of Patent: Jun. 12, 2001

(54) FAST SATELLITE-CENTRIC ANALYTICAL ALGORITHM FOR DETERMINING SATELLITE COVERAGE

(75) Inventors: Donald D. Brand, Jr., Philomont; Jerome Joseph Kalke, Jr., Ashburn; Ronald Lee Kling, Jr., Warrenton, all of VA (US)

(73) Assignee: TASC, Inc., Reading, MA (US)

( * ) Notice: Subject to any disclaimer, the term of this patent is extended or adjusted under 35 U.S.C. 154(b) by 0 days.

(21) Appl. No.: 09/352,328

(22) Filed: Jul. 13, 1999

(51) Int. Cl.$^7$ .................................................. H04B 7/185
(52) U.S. Cl. .......................... 342/352; 455/12.1; 701/226
(58) Field of Search ........................... 701/226; 342/352; 244/158 R; 455/12.1

(56) References Cited

U.S. PATENT DOCUMENTS

| | | | |
|---|---|---|---|
| 5,551,624 | * 9/1996 | Horstein et al. | ................. 244/158 R |
| 5,931,417 | * 8/1999 | Castiel | ................................ 342/352 |
| 6,021,309 | * 2/2000 | Sherman et al. | .................... 455/12.1 |

* cited by examiner

Primary Examiner—Theodore M. Blum
(74) Attorney, Agent, or Firm—Lowe Hauptman Gilman & Berner, LLP

(57) ABSTRACT

The satellite coverage problem involves the determination of a given satellite's in-view and out-of-view times and durations for a given ground point. To perform global coverage, the planet is divided into an even grid in spherical coordinates. Assuming a minimum elevation from the ground to the satellite of interest, the satellite's ground footprint longitude width is determined analytically at a given latitude. Ignoring planetary triaxality, the footprint is assumed to be east-west symmetric. All grid points with the footprint satisfy line-of-sight geometric constraints. The process is repeated for every satellite at every time point, and coverage statistics are generated over the grid at the end.

17 Claims, 8 Drawing Sheets

FIG. 5A  1, 2 and 3 Mutually Constrained

FIG. 5B  1, 2 and 4 Mutually Constrained

FIG. 5C  1, 3 and 4 Mutually Constrained

FIG. 5D  2, 3 and 4 Mutually Constrained

FAST SATELLITE-CENTRIC ANALYTICAL ALGORITHM FOR DETERMINING SATELLITE COVERAGE

FIELD OF THE INVENTION

The present invention relates generally to a method for determining satellite coverage over a planet's surface, and more particularly, to the determination of satellite coverage over the planets surface by a constellation of satellites. In particular, the present invention relates to a system for determining statistics of satellite coverage using a satellite-centric point of view instead of a planet-centric view.

BACKGROUND OF THE INVENTION

Determining how well a group of satellites cover a planet is a critical component of constellation design. Usually some minimum number of satellites must be visible to every point in the region of interest in order to satisfy the mission. A prime example is that of a cellular telephone satellite system. In order to provide worldwide coverage at every instant of time, at least one satellite must be visible to every point of the earth with an elevation greater than some minimum limit. From a constellation designer's point of view, the goal is to determine the minimum number of satellites required to satisfy the mission constraints. The fewer the number of satellites, the lower the cost of the entire constellation.

Classically, this optimization problem was solved using a brute force, planetary frame of reference approach. For example, if the goal is to provide worldwide single satellite coverage with n satellites, such that every ground point on the surface of the planet saw at least one satellite at an elevation of 15° or higher the method would be as follows.

The planet's surface is divided into a grid of latitude/longitude points at some degree of resolution (say 10°). The process is started at one latitude/longitude point. The orbit of one of n satellites is propagated over the period of interest checking (and retaining) the visibility of the one satellite over time. This is repeated for all n satellites. The next adjacent latitude/longitude point is advanced and the process is repeated for all n satellites until the entire grid has been evaluated. Assuming, for example, n=24 and a 24 hour time period of interest at 1 minute time steps then a total of [1440 time steps*24 satellites*(36*18) latitude/longitude points= 2.24e07] visibility calculations have to be performed. Obviously, as more satellites are added, grid density is increased, and constraints are added, the computational burden grows geometrically.

This classic approach has the advantage of being simple to implement and test, but the disadvantage of being extremely slow as more satellites are added. With the advent of satellite systems such as Iridium (66 satellites) it has become necessary to develop a coverage algorithm that gives results in a reasonable amount of time.

SUMMARY OF THE INVENTION

It is therefore an object of the present invention to provide a new method for calculating visibility that does not suffer from the computational burden of the prior art.

It is another object of the present invention to provide a simulation for determining satellite coverage over the earth's surface.

It is yet another object of the present invention to provide a method of determining satellite coverage by determining which grid points are in a satellite's line of view.

Another object of the present invention is to provide a method and apparatus wherein adding constraints reduces the number of calculations to perform.

Yet another object of the present invention is to store and output as much information about visibility as possible so that the resulting data can be analyzed for further information without having to repeat the analysis process.

Yet a further object of the present invention is to provide a system for determining statistics of satellite coverage using a satellite-centric point of view instead of a planet-centric view.

The new technique described in this patent application now solves the coverage problem at least 1000 times faster than the previously described prior art technique. Rather than calculate the amount of satellites that can be seen by a point on the ground, the new technique calculates the ground points which can be seen by the satellite. Consider a satellite that is orbiting the earth at a fairly low altitude at a point in time when it just crosses the equator at 0° longitude. From the satellite's point of view, only a small circle of earth is visible at this time. For example, say one point on the horizon is at 20° north and −30° east. Its complimentary point would be at 20° north and +30° east. Once these two points are known all other points between −30° east and +30° at 20° north can be marked as visible. This is repeated over the entire horizon filling in the visible region. This is done for every time step, in the orbit until the end time is reached. Whereas the old method calculated thousands of visibilities at each time point, the new method only calculates a few, and taking advantage of symmetry, fills in the rest.

These and other objects of the present invention are achieved by a method of determining satellite coverage over the surface of the earth by determining ground points visible to each of m satellites in a constellation orbiting the earth including dividing the surface of the earth into a matrix of grid points. A satellite ground footprint longitude width is determined at a given latitude for each satellite in the constellation for each time step in the orbit. The width of this line determines which grid points satisfy line-of-sight geometric constraints for each satellite in the constellation for each time step in the orbit. Coverage statistics for each satellite are generated.

The foregoing objects of the present invention are achieved by an article including at least one sequence of machine executable instructions on a medium bearing the executable instructions in machine readable form wherein execution of the instructions by one or more processors causes the one or more processors to divide the surface of the earth into a grid of grid points. A satellite ground footprint longitude width is determined at a given latitude for each satellite in the constellation for each time step in the orbit.

The foregoing objects of the present invention are achieved by a computer architecture including means for dividing the surface of the earth into a grid of grid points. First determining means are provided for determining a satellite ground footprint longitude width at a given latitude for each satellite in the constellation for each time step in the orbit. Second determining means are provided for determining which of the grid points satisfy line-of-sight geometric constraints for each satellite in the constellation for each time step in the orbit. Generating means are provided for generating coverage statistics.

The foregoing objects of the present invention are achieved by a computer system a processor and a memory coupled to the processor, the memory having stored therein sequences of instructions, which, when executed by the processor, causes the processor to perform the steps of dividing the surface of the earth into a grid of grid points. A satellite ground footprint longitude width is determined at a given latitude for each satellite in the constellation for each time step in the orbit. It is determined which of the grid points satisfy line-of-sight geometric constraints for each satellite in the constellation for each time step in the orbit. Coverage statistics for each satellite are generated.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein:

FIG. 5 is an illustration of a left diagonal matrix showing minimum conditions for 3 of 4 satellites mutually satisfying pair-wise constraints;

BEST MODE FOR CARRYING OUT THE INVENTION

A method and apparatus for determining satellite coverage using a satellite-centric analytical algorithm are described. In the following description, for purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Hardware Overview

Figure 1:
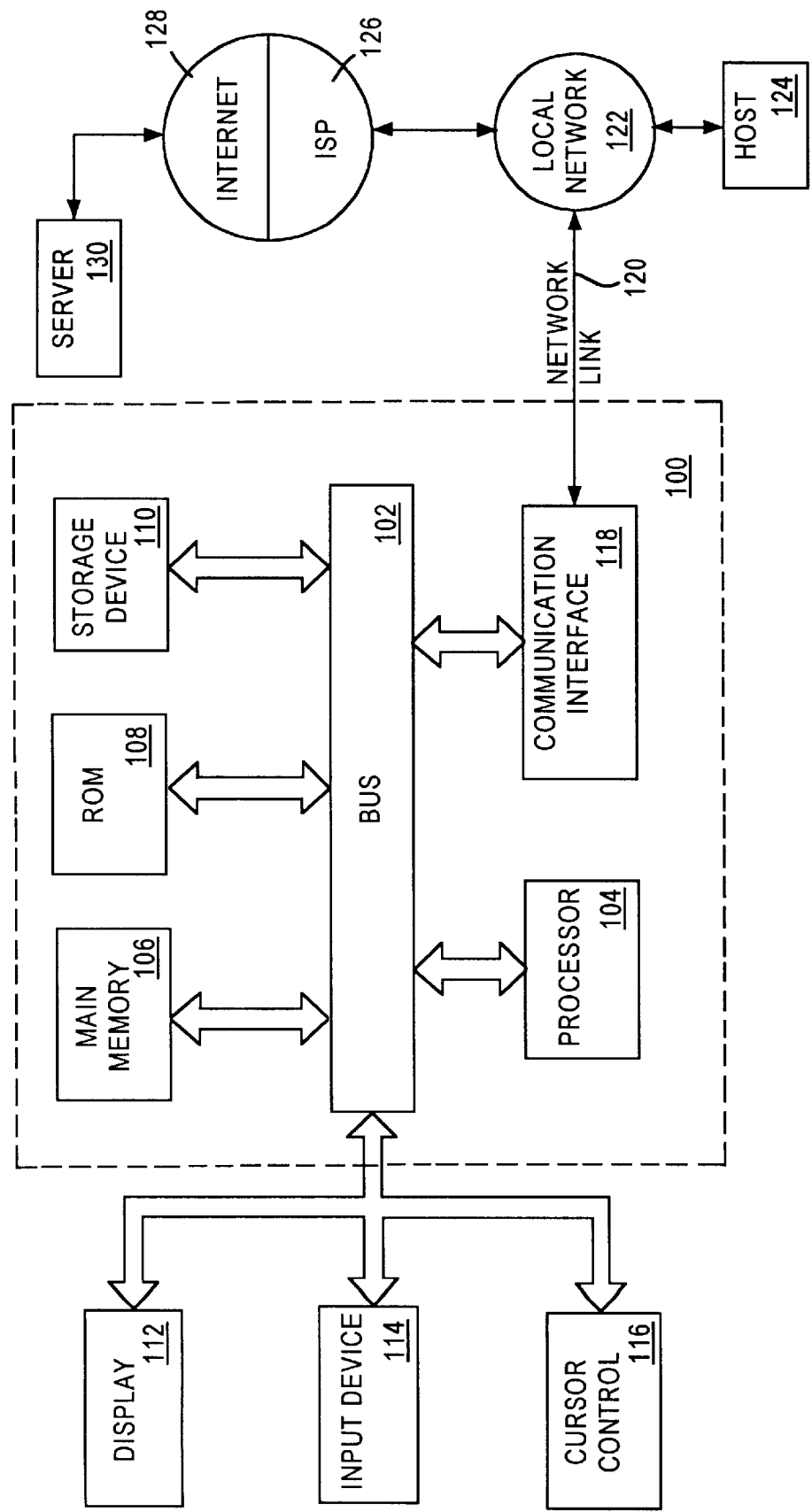
FIG. 1 is a high level block diagram of a computer architecture usable with the present invention.

FIG. 1 is a block diagram illustrating an exemplary computer system 100 upon which an embodiment of the invention may be implemented. The present invention is usable with currently available personal computers, mini-mainframes and the like.

Computer system 100 includes a bus 102 or other communication mechanism for communicating information, and a processor 104 coupled with the bus 102 for processing information. Computer system 100 also includes a main memory 106, such as a random access memory (RAM) or other dynamic storage device, coupled to the bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to the bus 102 for storing static information and instructions for the processor 104. A storage device 110, such as a magnetic disk or optical disk, is provided and coupled to the bus 102 for storing information and instructions.

Computer system 100 may be coupled via the bus 102 to a display 112, such as a cathode ray tube (CRT) or a flat panel display, for displaying information to a computer user. An input device 114, including alphanumeric and other keys, is coupled to the bus 102 for communicating information and command selections to the processor 104. Another type of user input device is cursor control 116, such as a mouse, a trackball, or cursor direction keys for communicating direction information and command selections to processor 104 and for controlling cursor movement on the display 112. This input device typically has two degrees of freedom in two axes, a first axis (e.g., x) and a second axis (e.g.,) allowing the device to specify positions in a plane.

The invention is related to the use of a computer system 100, such as the illustrated system, to calculate and determine satellite coverage over the earth's surface. According to one embodiment of the invention, the determination is provided by computer system 100 in response to processor 104 executing sequences of instructions contained in main memory 106. Such instructions may be read into main memory 106 from another computer-readable medium, such as storage device 110. However, the computer-readable medium is not limited to devices such as storage device 110. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in the main memory 106 causes the processor 104 to perform the process steps described below. In alternative embodiments, hard-wired circuitry may be used in place of or in combination with computer software instructions to implement the invention. Thus, embodiments of the invention are not limited to any specific combination of hardware circuitry and software.

Computer system 100 also includes a communication interface 118 coupled to the bus 102. Communication interface 108 provides a two-way data communication as is known. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. In the preferred embodiment communication interface 118 is coupled to a virtual blackboard. Wireless links may also be implemented. In any such implementation, communication interface 118 sends and receives electrical, electromagnetic or optical signals which carry digital data streams representing various types of information. Of particular note, the communications through interface 118 may permit transmission or receipt of the satellite information. For example, two or more computer systems 100 may be networked together in a conventional manner with each using the communication interface 118.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication services through the world wide packet data communication network now commonly referred to as the "Internet" 128. Local network 122 and Internet 128 both use electrical, electromagnetic or optical signals which carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application provides for determining satellite coverage using a satellite-centric analytical algorithm as described herein.

The received code may be executed by processor 104 as it is received, and/or stored in storage device 110, or other non-volatile storage for later execution. In this manner, computer system 100 may obtain application code in the form of a carrier wave.

The present invention provides a simulation for determining satellite coverage using a satellite-centric analytical algorithm according to the present invention.

Figure 2:
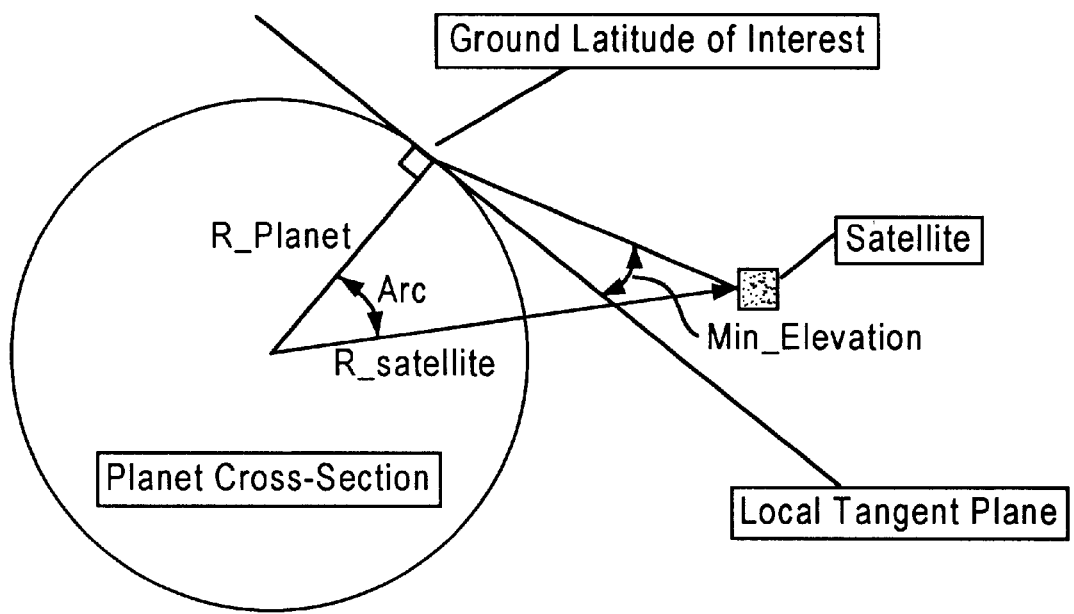
FIG. 2 is an illustration depicting how arc length between a sub-satellite point, a line extending from the sub-satellite point and the satellite, and a ground latitude of interest is determined.

FIG. 2 depicts a planet cross-section and includes a satellite in an orbit of a certain inclination. This satellite is depicted in the figure as being at the minimum elevation of interest. This satellite is one of n satellites in a constellation of satellites. An arc length is first determined. As depicted in FIG. 2, constraints are applied for each satellite including minimum elevation constraints from the ground to the satellite for each time point in a satellite orbit. A sub-satellite point is depicted which is a point within the planets surface. The R_Planet extends between the sub-satellite point and a ground latitude of interest. A local tangent plane is drawn at right angles from a sub-satellite point or radius of the planet (R_Planet). The arc length to be determined extends between the R_Planet and a line R_Satellite which extends from the sub-satellite point to the satellite in orbit. The arc length is the arc length on the surface of the earth between the intersection of the R_Planet and the R_Satellite lines where these lines intersect with the surface of the earth. The orbits of all satellites of interest are propagated and stored over the time period of interest, including the variables R_Planet, R_Satellite and the minimum elevation. This time intensive process occurs only once for each satellite.

The arc length between the sub-satellite point and the altitude of interest is determined with Equation 1.

$$\text{Arc} = \cos^{-1}\left[\frac{R\_Planet \cdot \cos(Min\_Elevation)}{R\_Satellite}\right]$$

where R_Planet is a function of the geodetic latitude in question.

Figure 3:
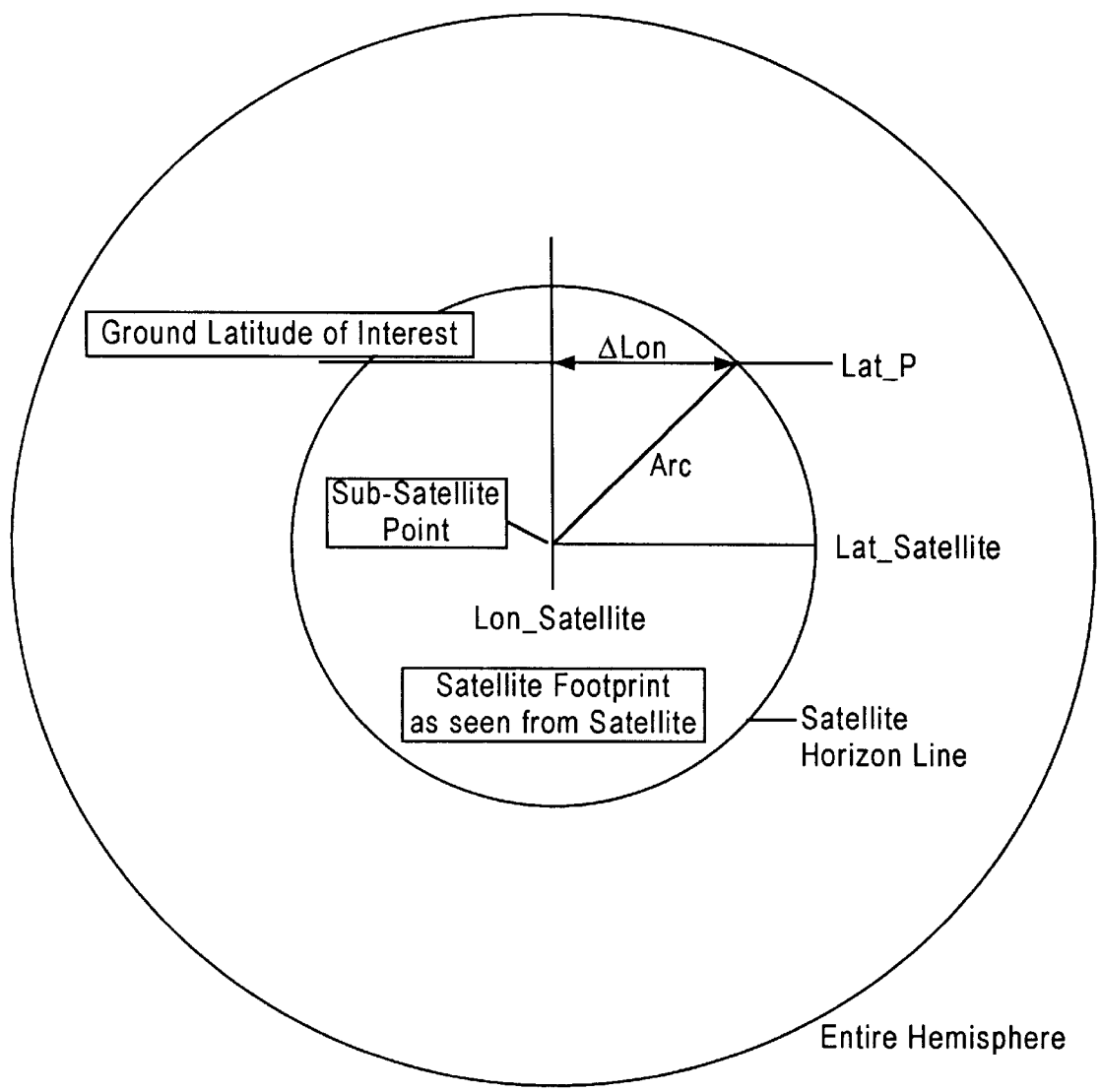
FIG. 3 is an illustration depicting a graphical representation of a satellite footprint and a calculated ΔLon.

FIG. 3 provides a graphical representation of the footprint imposed on the hemisphere and a change in longitude (ΔLon) that is calculated for each time point for each satellite. FIG. 3 is the same as FIG. 2, but is illustrated from the satellite's perspective when the satellite is near the equator. As the satellite approaches one of the poles, the latitude of interest line, encircling the pole, will no longer look like a straight line as illustrated in FIG. 3. Instead, the latitude of interest line will be a section of a circle intersecting the satellite footprint. If the satellite footprint contains the pole, it is possible for the latitude of interest to form a closed circle within the satellite footprint.

The satellite in FIG. 3 would be located above the paper as depicted in FIG. 2 above the point called the sub-satellite point at the longitude of the satellite. At right angles from the longitude of the satellite, is the latitude of the satellite (Lat_Satellite). The ground latitude of interest (Lat_LP) intersects a point on the planet's surface. The ΔLon is formed between this point and the Lon_Satellite. Arc is the distance from the sub-satellite point to the horizon at the ground latitude of interest. The footprint is defined as the area between (Lon_Satellite−ΔLon) (depicted in FIG. 3) to (Lon_Satellite+ΔLon) (not depicted in FIG. 3 due to symmetry of planet). It can be inferred that every grid point within the footprint is in view, that is, every grid point that falls within the longitudes (Lon_Satellite−ΔLon) to (Lon_Satellite+ΔLon).

Next, the width of the footprint is determined using Equation 2.

$$\Delta Lon = \cos^{-1}\left[\frac{\cos(\text{Arc}) - \sin(Lat\_Satellite) \cdot \sin(Lat\_P)}{\cos(Lat\_Satellite) \cdot \cos(Lat\_P)}\right]$$

These results are stored in an array of the latitude/longitude size grid and the process is repeated for every satellite. New arrays are created as needed to store statistics concerning the m satellites in view at any given time. For example, if, during the simulation, it is found that two satellites is the maximum seen simultaneously by any ground point at any instant, the algorithm will generate an array for single satellite coverage and one for duel satellite coverage. The information stored at each grid point is the total contact time thus far, the time of the previous satellite set, a count of the number of separate contacts and an accumulation of the square of each contact duration. This is repeated for every time step in the simulation.

Once the simulation is complete, gap statistics, i.e., how often is the point not seen, can also be determined. The end result is separate global statistics for m satellites, where m varies from one to the maximum number of satellites in view from any given ground point at any given instant.

When constraints are added the problem becomes more complicated. There are three classes of constraints distinguished by what point in the process they are checked. The three classes of constraints include chain constraints, global constraints and post-processing constraints. These will be discussed in the order the constraints are evaluated.

Chain Constraints

A chain constraint is a constraint placed on a system of satellites which requires specific links to be available (links from satellite to satellite or from satellite to a specific target location relative to the planet). If a particular satellite's chain constraints are satisfied, its field of view is considered in the coverage analysis. If not, the satellite field is eliminated early in the analysis.

Figure 4:
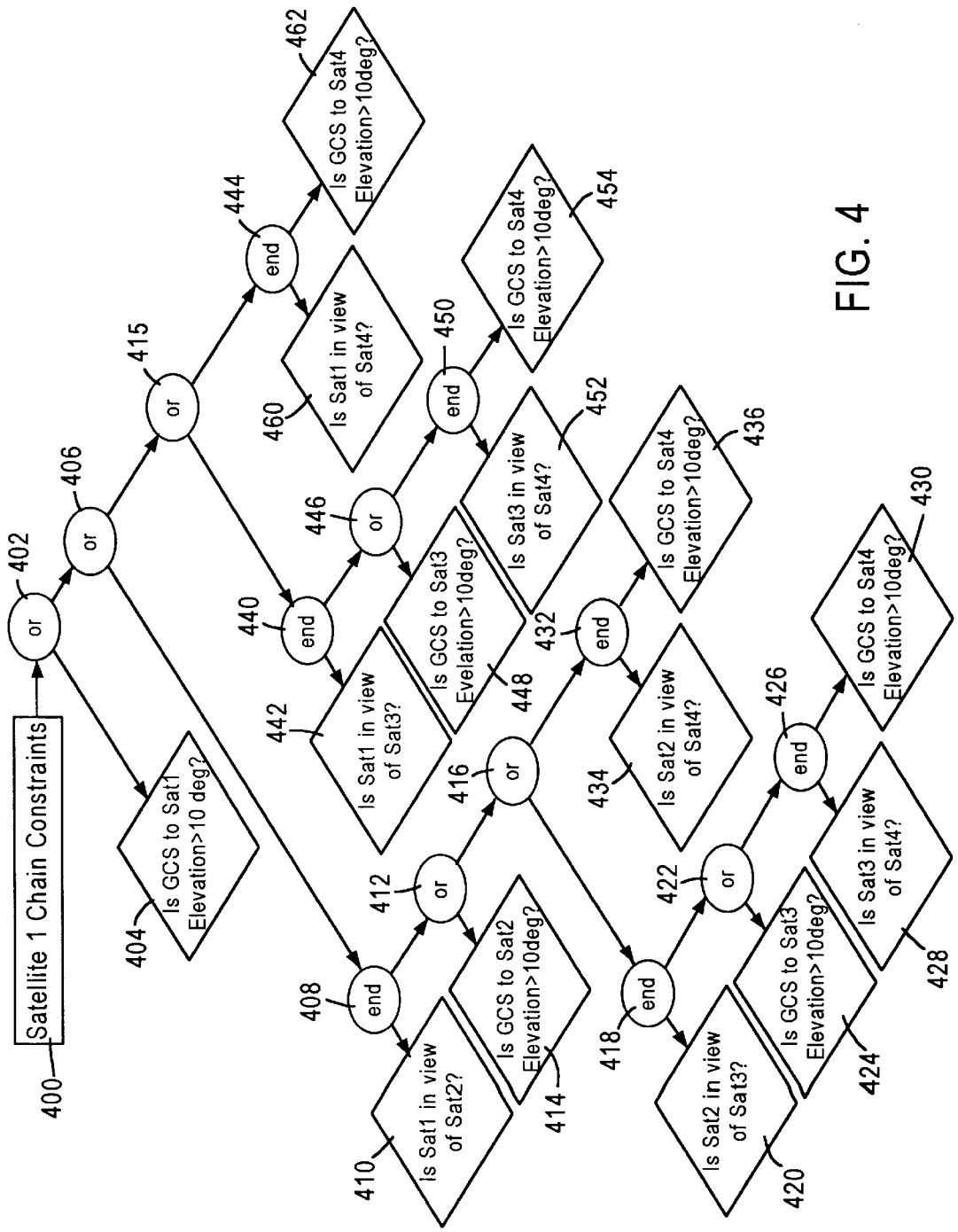
FIG. 4 is an illustration of a chain constraint decision tree example.

Chain constraints are implemented using a decision tree as illustrated in FIG. 4. Each branch node in the tree is either an "And" node or an "Or" node. Each leaf in the tree is either a ground station-in-view constraint (elevation, azimuth or range), or the leaf is a satellite-in-view constraint. The tree is evaluated recursively and terminates early (meaning if an Or node's left branch evaluates to true, the right branch is never evaluated).

For example, if a remote sensing satellite was designed with no on-board data storage device, it would only be able to downlink data to its ground control center (GCS) when the ground control center is in view. The coverage of the satellite reduces to the area of the planet that can be seen only while the ground control station is in view. This is a chain constraint from a single satellite to a single ground control station with a minimum elevation limit.

A more complicated example would be a telecommunications satellite constellation that must use cross-links between satellites in the constellation to deliver the signal to the ground control site. Using a chain constraint, a path must be found to the ground through one or more relay satellites. If a path cannot be found at a given instant, the satellite in question is considered inactive and its field-of-view is not calculated.

Consider the constraint that at least one satellite in this telecommunications constellation of four must be visible to a ground control site at an elevation greater than 10°. Either that or one satellite in the constellation must be in view that could relay that data to the ground control site. The decision tree for this case is depicted in FIG. 4 for satellite 1.

Each diamond shaped box returns a true or a false. Both children of an "And" node are evaluated only if the left-hand child returns true. Similarly, both children of an "Or" node are evaluated only if the left-hand node returns false. Thus, if satellite 1 is visible to the GCS, the right child of the top-most "Or" node is not evaluated and the decision tree evaluation returns rapidly, skipping the complexity of the tree.

Referring again to FIG. 4, at step 400 the process is started including inputting satellite 1 chain constraints. An OR node 402 branches to a decision box 404 where it is determined if the ground control station to satellite 1 elevation is greater than 10°. If the answer at decision box 404 is true, then the process is terminated at step 404. If the answer at decision box 404 is false, the right branch is evaluated which includes OR node 406 and AND node 408. At AND node 408, the decision box 410 is evaluated. At decision box 410 it is determined if satellite 1 is in view of satellite 2. If the answer at decision box 410 is false, the process proceeds to OR node 414. If decision box 410 returns true, then the process proceeds to OR node 412. At decision box 414, it is determined if the ground control station to satellite 2 elevation is greater than 10°. If decision box 414 returns true, then the process is ended at decision box 414. If decision box 414 returns false then an OR node 416 is evaluated. The left branch of OR node 416 is AND node 418. At decision box 420 it is determined if satellite 2 is in view of satellite 3. If box 420 returns true then the process proceeds to OR node 422. At decision box 424 it is determined if the ground control station to satellite 3 elevation is greater than 10°. If decision box 424 returns true, then the process is completed at box 424. If decision box 424 returns false then the process proceeds to AND node 426. At decision box 428 it is determined if satellite 3 is in view of satellite 4. If decision box 428 returns false then the process proceeds to OR node 416. If decision box 428 returns true then the process proceeds to decision box 430 where it is determined if ground control station to satellite 4 elevation is greater than 10°. If decision box 430 returns true then the process is completed at step 430.

Returning to OR node 416, the process proceeds to AND node 432 where it is determined if satellite 2 is in view of satellite 4. If decision box 434 returns false, the process proceeds to OR node 415. If decision box 434 returns true, the process proceeds to decision box 436. At decision box 436, it is determined if the ground control station to satellite 4 elevation is greater than 10 degrees. If decision box 436 returns false, then the process proceeds to OR node 415. If decision box 436 returns true, then the process is ended.

Returning to OR node 415, the process proceeds to AND node 440 where it is determined if satellite 1 is in view of satellite 3. At decision box 442 it is determined if satellite 1 is in view of satellite 3. If decision box 442 returns false then the process proceeds to AND node 444. If decision box 442 returns true then the process proceeds to OR node 446. At decision box 448 it is determined if the ground control station to satellite 3 elevation is greater than 10°. If decision box 448 returns false then the process proceeds to AND node 450. If decision box 448 returns true then the process is ended. From AND node 450 it is determined at decision box 452 if satellite 3 is in view of satellite 4. If decision box 452 returns true then the process proceeds to decision box 454 where it is determined if the ground control station of satellite 4 elevation is greater than 10°. If decision box 454 returns true then the process is completed at step 454. If decision box 454 returns false then the process proceeds to AND node 444. From AND node 444 the process proceeds to decision box 460 where it is determined if satellite 1 is in view of satellite 4. If decision box 460 returns false then the process is completed at step 460 and satellite 1 cannot communicate with a ground control station at the time point of interest. If decision box 460 returns true then the process proceeds to decision box 462 where it is determined if the ground control station to satellite 4 elevation is greater than 10°. If decision box 462 returns false then the process is completed and satellite 1 cannot view a ground control station. If decision box 462 returns true then the process is completed and satellite 1 can communicate with a ground control station.

Global Constraints

Global constraints are applied intrinsically during the footprint calculations described above. A global constraint is one that applies equally across the globe, for example, ground to spacecraft minimum and maximum elevations and minimum and maximum azimuths.

Post-Processing Constraints

A post-processing constraint is checked after the footprint calculations are performed. These are constraints that rely on the results of other satellites or rely on previously calculated information compared to results from the global constraint calculations. Post-processing constraints can be broken down into two types: pair-wise constraints and minimum contact duration constraints.

Pair-Wise Constraints

A pair-wise constraint is a constraint set on a quantity derived from a pair of satellites. The constraints calculated are azimuth differences, elevation differences, range differences, and angular separation differences.

For example, a global positioning satellite (GPS) system increases in accuracy with geometric diversity. The global coverage of GPS could be constrained such that the angular separation in azimuth between two ground to satellite vectors is greater than or equal to some minimum value. To solve this problem, the azimuths from every in-view satellite to every grid point in question must be calculated. The difficult part is determining the amount of satellites that mutually satisfy the constraint. For example, if three satellites are in view, the azimuths of satellite 1 and 2 satisfy the constraint, the azimuths of satellite 2 and 3 satisfy the constraint, but the azimuths of 1 and 3 do not, how many satellites mutually satisfy the pair-wise constraint? The answer is two.

To solve this problem quickly for n satellites, the following technique is used as depicted in FIG. 5. A left diagonal matrix is created where each matrix element constitutes a boolean value corresponding to the evaluation of the pair-wise constraints between two currently in-view satellites. Then, with this matrix filled out, a pair-wise tree is evaluated that returns the number of satellites that mutually satisfy the constraints. This pair-wise tree is independent of the actual constraint, as the pair-wise tree operates on the boolean matrix (i.e., the same tree is used for all constraints). The pair-wise tree functions as a pattern recognizer of the boolean matrix values.

For example, if four satellites are in view, the combinations of satellites whose constraints are mutually satisfied is as follows.

12, 13, 14,23, 24, 34=2 satellites satisfy constraints.
123, 124, 134, 234=3 satellites satisfy constraints.
1234=4 satellites satisfy constraints.

Given the requirement that three satellites satisfy the azimuth constraints, the minimum conditions which must be satisfied are shown in FIG. 5. Note that if any of the false states in the matrices shown in FIG. 5 are true, the pair-wise constraint tree still returns a value of 3. Only if all the values in the matrix are true is a value of 4 returned.

Figure 6:
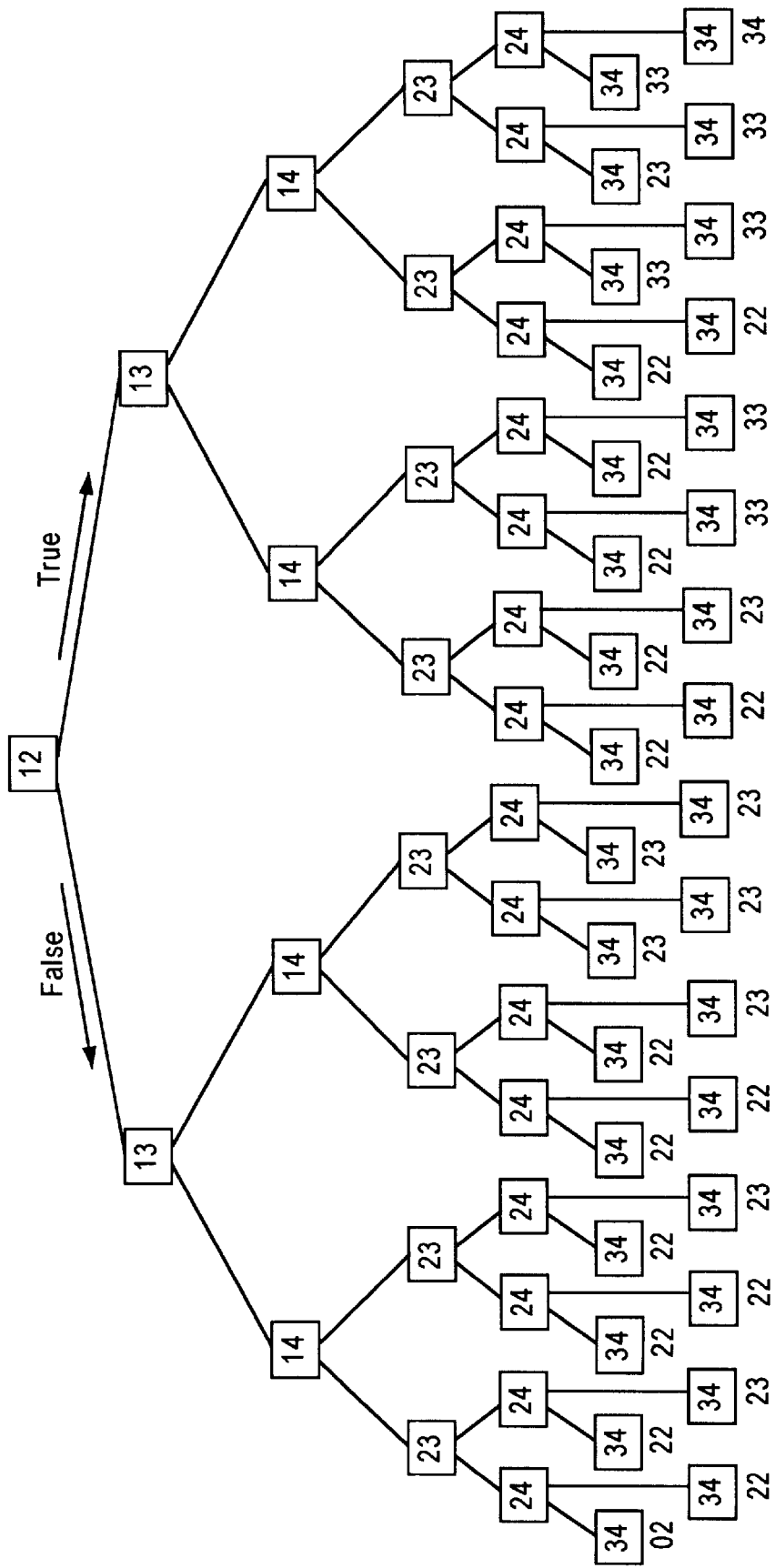
FIG. 6 is an illustration of a pair-wise tree before compression.

The pair-wise evaluation tree is created in memory before the simulation begins, thus saving considerable time. FIG. 6 illustrates the pair-wise tree for four satellites. Every combination of true and false state in the matrix will terminate in a leaf value corresponding to the number of satellites that mutually satisfy the constraints. Note that each right branch indicates that the matrix location corresponding the ordered pair contains a true value.

Figure 7:
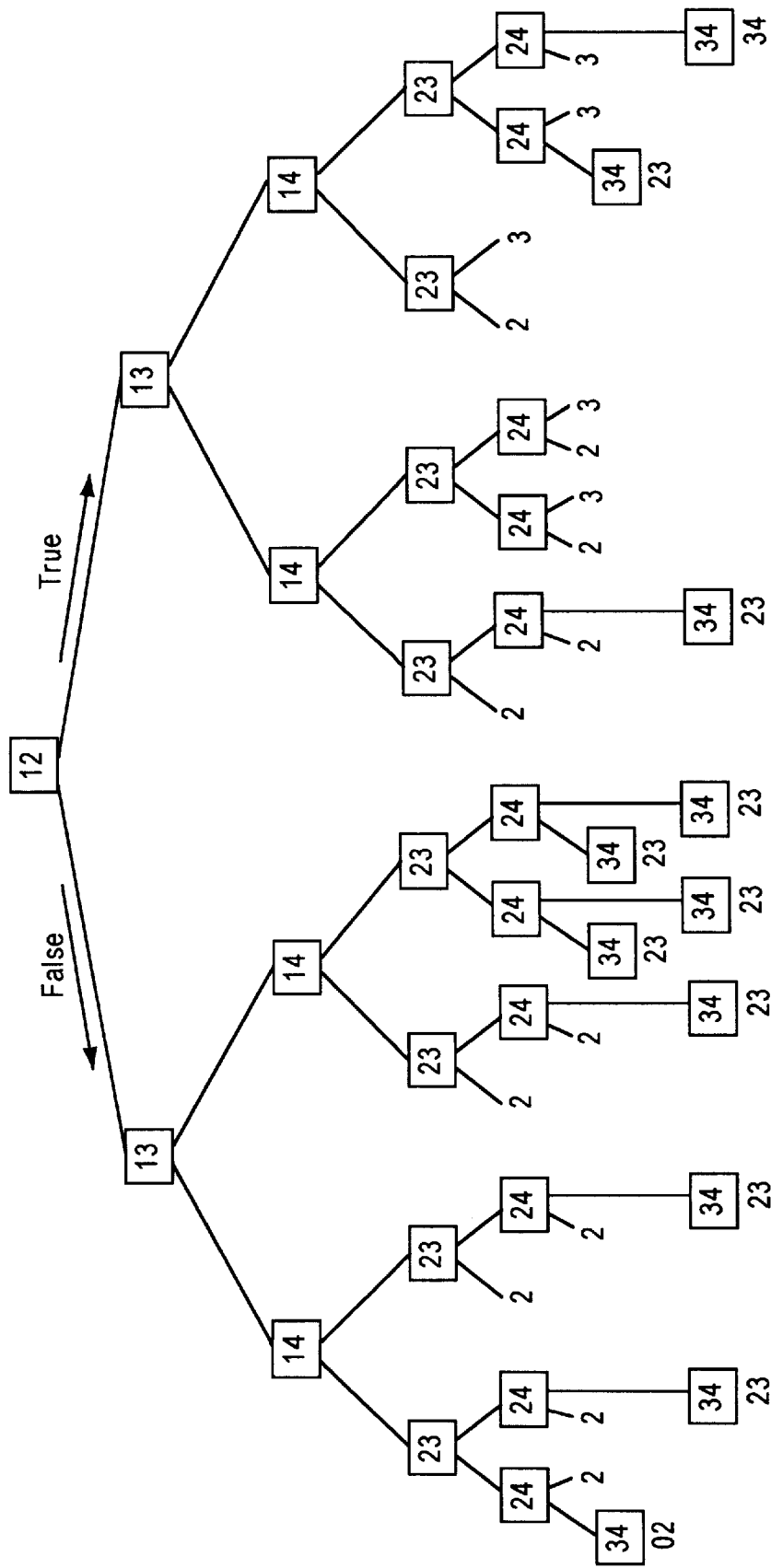
FIG. 7 is an illustration of the pair-wise tree of FIG. 6 after compression.

The tree can be compressed by breaking off all the branches whose result is constant. FIG. 7 depicts the same tree as FIG. 6 with redundancy eliminated.

A path in bold in FIG. 7 illustrates the case where satellites 1 and 2, 1 and 3, 2 and 3 satisfy the constraint, but 1 and 4 do not. This is a 123 combination whose result is 3 in view satellites.

So, once the algorithm determines how many satellites are in view, and after it evaluates all the pair-wise quantities being constrained (essentially filling in the matrix), the pair-wise tree is evaluated to determine how many satellites are in view at that instant.

Minimum Contact Duration Constraints

Short duration passes for some satellites should not be considered valid passes if, for example, there is not enough time for the satellite to perform its function. A minimum contact duration constraint can be applied such that a grid point on the ground is not considered in view of a satellite until its total contact duration exceeds some minimum value. This is a post-processing constraint because the footprint must be calculated before this assessment can be done.

Figure 8:
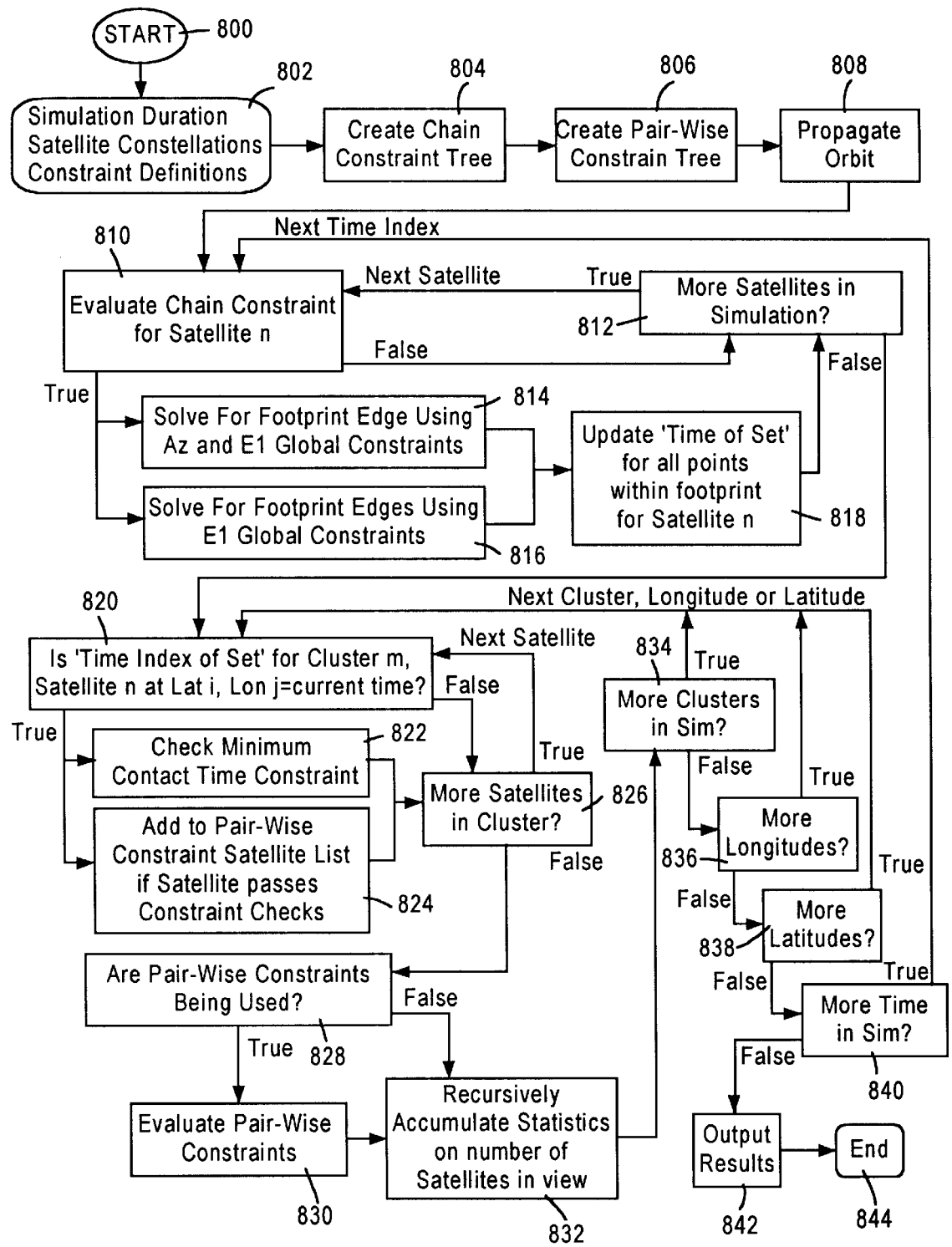
FIG. 8 is a flow diagram according to the present invention.

FIG. 8 is an algorithm flow diagram according to the present invention. At step 800, the process is started. At step 802, algorithm inputs are inputted including the satellite constellation(s), the simulation duration and any constraints to be applied. At step 804 the chain constraint tree is created. At step 806 the pair-wise constraint is built. The chain constraint tree and the pair-wise constraint tree are built in advance of the simulation time loop. At step 808 the orbits for each of the satellites in the constellation are propagated and stored in memory 106 for later access. The algorithm is constructed such that the coverage statistics can be determined from a single pass through the simulation. A typical time step can have a duration of one minute.

At step 810, starting with satellite 1 at the first time step, the chain constraints are evaluated (if there are any). If the constraints check passes at step 810, then the footprint is calculated corresponding to the evaluation and azimuth global constraints at step 814 or according to elevation constraints at step 816. All satellite specific grid points within the footprint are set as visible by setting the time of set as the current time at step 818. Through this technique, iteration to determine the exact time of set is avoided at the expense of some error no greater than the simulation time step. This process is repeated for all satellites in the simulation for the given time step at step 812.

It is now necessary to step through the grid to check the post-processing constraints and to gather statistics.

In order to treat satellite as groups independent of other groups, a satellite cluster concept is used. The purpose of the cluster is to prevent 2 satellites from one cluster and 1 from another to add up to 3 satellites simultaneously in view. With cluster, the maximum, in this case, would be 2.

Starting at the first point in the grid, and the first satellite of the first cluster, the program determines which satellites are visible. The goal is to determine the number of satellites that are simultaneously in view and that satisfy all the post-processing constraints (either minimum contact duration or pair-wise constraints). If pair-wise constraints are being used, the boolean matrix is filled in, and, once all the satellites from the current cluster are processed, the pair-wise constraint tree is traversed to determine the number of satellites that mutually satisfy the constraints.

With the number of satellites in view for the current time step known, the global grid matrices accumulate information at step 820.

At step 820 it is determined if the "Time Index of Set" for cluster m, satellite n at Lat i, Lon j=current time. If the determination at step 820 is true the process proceeds to steps 822 or 824. The choice is determined by the constraints selected by the user. If 820 returns false then the process proceeds to step 826. At step 822 the minimum contact time constraint is checked. Or, at step 824 the pair-wise constraint satellite list is added if the satellite passes the constraint checks. From steps 822 or 824 the process proceeds to step 826. At step 826 it is determined if there are more satellites in the cluster. If step 826 is true then the process returns to step 820. If step 826 is false then the process proceeds to step 828 where it is determined if the pair-wise constraints are being used. If step 828 returns true then the process proceeds to step 830 where the pair-wise constraints are evaluated. If step 828 returns false then the process proceeds to step 832. From either steps 828 or 830, the process proceeds to step 832 where statistics are recursively accumulated on the number of satellites in view. From step 832 the process proceeds to step 834 where it is determined if there are more clusters in the simulation. If step 834 returns true then the process returns to step 820. If step 834 returns false then the process proceeds to step 836 where it is determined if there are more longitudes. If step 836 returns true then the process returns to step 820. If step 836 returns false then the process proceeds to step 838 where it is determined if there are more latitudes. If step 838 returns true then the process returns to step 820. If step 838 returns false then the process proceeds to step 840. At step 840 it is determined if there is more time in the simulation. If step 840 returns true then the process returns to step 810. If step 840 returns false then results are outputted at step 842. At step 844 the process is ended.

There is a separate matrix for every ordinal number of satellites that can possibly be simultaneously in view, created as needed. This process repeats for every cluster of satellites, for the entire grid, and for every time step in the simulation.

Note that, in the flow diagram, there are cases where the flow splits into two paths. In these cases, the logic behind which path is chosen is set at the algorithm's initialization based upon the user defined constraints.

It should now be apparent that an algorithm has been described which can quickly determine satellite coverage statistics for a constellation of satellites from a satellite-centric point of view.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A method of determining satellite coverage over the surface of the earth by determining ground points visible to each of m satellites in a constellation orbiting the earth, comprising:

(a) dividing the surface of the earth into a grid of grid points;

(b) determining a satellite ground footprint longitude width at a given latitude for each satellite in the constellation for each time step in the orbit;

(c) determining which of the grid points satisfy line-of-sight geometric constraints for each satellite in the constellation for each time step in the orbit; and (d) generating coverage statistics.

2. The method of claim 1, comprising determining an arc length between a sub-satellite point and an altitude of interest.

3. The method of claim 2, wherein arc length is determined according to the equation:

$$\mathrm{Arc} = \cos^{-1}\left[\frac{R\_\mathrm{Planet}\cdot\cos(\mathrm{Min\_Elevation})}{R\_\mathrm{Satellite}}\right]$$

where
    R_Planet is a function of the geodetic latitude in question;
    Min_Elevation is a predetermined minimum elevation of the satellite in question;
    R_Satellite is the orbit radius of the satellite in question.

4. The method of claim 3, wherein the width of the footprint is determined according to the equation:

$$\mathrm{Arc} = \cos^{-1}\left[\frac{R\_\mathrm{Planet}\cdot\cos(\mathrm{Min\_Elevation})}{R\_\mathrm{Satellite}}\right].$$

5. The method of claim 1, comprising applying chain constraints for each satellite in the constellation for reach time step in the orbit.

6. The method of claim 5, wherein a chain constraint is a requirement that a link be available, the link being a link to/from one satellite to another satellite or being to/from a satellite to a specific target location relative to the planet.

7. The method of claim 1, comprising applying global constraints during step (b).

8. The method of claim 1, comprising applying post-processing constraints.

9. The method of claim 8, comprising calculating a pair-wise constraint for a pair of satellites.

10. The method of claim 8, comprising, for a pair of satellites, calculating azimuth differences, elevation differences, range differences, and angular separation differences.

11. The method of claim 8, comprising creating a left diagonal matrix where each matrix element constitutes a boolean value.

12. The method of claim 11, wherein the boolean value corresponds to the evaluation of pair-wise constraints between two currently in-view satellites.

13. The method of claim 1, comprising determining a minimum contact duration of a grid point if the grid point is not in view of the satellite for at least a minimum amount of time.

14. The method of claim 1, wherein coverage statistics includes for each ground point, and for each time step, the ground points in view of each satellite.

15. An article comprising:
    at least one sequence of machine executable instructions;
    a medium bearing the executable instructions in machine readable form;
    wherein execution of the instructions by one or more processors causes the one or more processors to:
    divide the surface of the earth into a grid of grid points;
    determine a satellite ground footprint longitude width at a given latitude for each satellite in the constellation for each time step in the orbit;
    determine which of the grid points satisfy line-of-sight geometric constraints for each satellite in the constellation for each time step in the orbit; and
    generate coverage statistics.

16. A computer architecture, comprising:
    dividing means for dividing the surface of the earth into a grid of grid points;
    first determining means for determining a satellite ground footprint longitude width at a given latitude for each satellite in the constellation for each time step in the orbit;
    second determining means for determining which of the grid points satisfy line-of-sight geometric constraints for each satellite in the constellation for each time step in the orbit; and
    generating means for generating coverage statistics.

17. A computer system, comprising:
    a processor; and
    a memory coupled to said processor, the memory having stored therein sequences of instructions, which, when executed by said processor, causes said processor to perform the steps of:

dividing the surface of the earth into a grid of grid points;

determining a satellite ground footprint longitude width at a given latitude for each satellite in the constellation for each time step in the orbit;

determining which of the grid points satisfy line-of-sight geometric constraints for each satellite in the constellation for each time step in the orbit; and generating coverage statistics.

* * * * *